United States Patent
Ghia et al.

(10) Patent No.: US 7,061,283 B1
(45) Date of Patent: Jun. 13, 2006

(54) DIFFERENTIAL CLOCK DRIVER CIRCUIT

(75) Inventors: Atul V. Ghia, San Jose, CA (US);
Adebabay M. Bekele, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/836,969

(22) Filed: Apr. 30, 2004

(51) Int. Cl.
*H03B 1/00* (2006.01)

(52) U.S. Cl. .......................................... 327/108; 327/52

(58) Field of Classification Search ................... 327/52, 327/69, 78, 82, 89, 108–112, 261–264, 266, 327/270–272, 274, 287, 295–296; 326/82–92
See application file for complete search history.

(56) References Cited

U.S. PATENT DOCUMENTS

| | | | | |
|---|---|---|---|---|
| 4,797,586 A | * | 1/1989 | Traa | 327/276 |
| 6,060,930 A | * | 5/2000 | Choi | 327/276 |
| 6,307,692 B1 | * | 10/2001 | Brown et al. | 360/45 |
| 6,657,474 B1 | | 12/2003 | Varadarajan | |
| 6,853,220 B1 | * | 2/2005 | De Laurentiis et al. | 327/108 |

FOREIGN PATENT DOCUMENTS

JP 2002-314423 * 4/2001

OTHER PUBLICATIONS

U.S. Appl. No. 10/836,722, Apr. 30, 2004, Vadi et al.
U.S. Appl. No. 10/837,009, filed Apr. 30, 2004, Vadi et al.
U.S. Appl. No. 10/836,388, filed Apr. 30, 2004, Ghia et al.

* cited by examiner

Primary Examiner—My-Trang Nu Ton
(74) Attorney, Agent, or Firm—Kim Kanzaki (57) ABSTRACT

A system for driving a differential signal on a signal line and converting the differential signal from a rail-to-rail differential signal to a small signal differential signal is described. An exemplary embodiment of the circuit includes a first programmable differential driver circuit receiving a differential input; a programmable delay circuit receiving the differential input and coupled to a second programmable differential driver circuit; and a summation circuit coupled to the first and second differential driver circuits.

18 Claims, 8 Drawing Sheets

DIFFERENTIAL CLOCK DRIVER CIRCUIT

FIELD OF THE INVENTION

The present invention relates generally to circuit design and more specifically, to a differential driver.

BACKGROUND

In order to improve, noise, jitter, duty cycle distortion, and skew in distribution of gigahertz clock signals in a clock tree, differential signals have been used. Specifically, U.S. Pat. No. 6,657,474, titled "Circuits for a Low Swing Clocking Scheme", by H. D. Varadarajan, issued Dec. 2, 2003, in FIG. 3 discloses a translator/driver circuit that receives a full voltage swing clock signal from a phase locked loop and converts the clock signal to a low voltage swing clock signal. The translator/driver circuit has the disadvantage that several repeaters are necessary to amplify the signals along an interconnection line. In addition the translator/driver circuit as shown in FIG. 5 of the patent, if it works at all, has a gain that appears flat across frequency, hence not compensating for the high frequency attenuation of the interconnection line.

Therefore, there is a need for a better driver circuit that converts a full voltage swing clock signal input to produce a low voltage swing clock signal output, which can be driven over an interconnection line in an integrated circuit (IC).

SUMMARY

The present invention relates generally to a system for driving a differential signal on a signal line and converting the differential signal from a full swing voltage (i.e., rail-to-rail) differential signal to a low voltage swing (i.e., small signal) differential signal.

An exemplary embodiment of the present invention has a circuit. The circuit includes a first programmable differential driver circuit receiving a differential input; a programmable delay circuit receiving the differential input and coupled to a second programmable differential driver circuit; and a summation circuit coupled to the first and second differential driver circuits. In addition the first programmable differential driver circuit has a first programmable current source and the second programmable differential driver circuit has a second programmable current source.

Another embodiment of the present invention includes a differential clock driver circuit having: a first driver circuit coupled to a first programmable current source, and receiving a rail-to-rail differential input signal; a programmable delay circuit coupled to the first driver circuit and configured to delay the rail-to-rail differential input signal; a second driver circuit coupled to the programmable delay circuit and coupled to a second programmable current source; a pulse generator receiving the rail-to-rail differential input signal and a differential output signal of the programmable delay circuit; a third driver circuit coupled to the pulse generator; and a summation circuit coupled to the first, second, and third driver circuits and outputting a small signal differential output signal, where the small signal differential output signal of the summation circuit is produced by adding together a differential output signal of the first driver circuit to a differential output signal of the second driver to a differential output signal of the third driver.

The present invention will be more full understood in view of the following description and drawings.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention.

Throughout the following description, signal nodes, signal lines, signal waveforms, and the associated signals may be referred to using like designations; in each case, whether a given reference is to a signal or the corresponding node, line, or waveform will be clear from the context.

Figure 1:
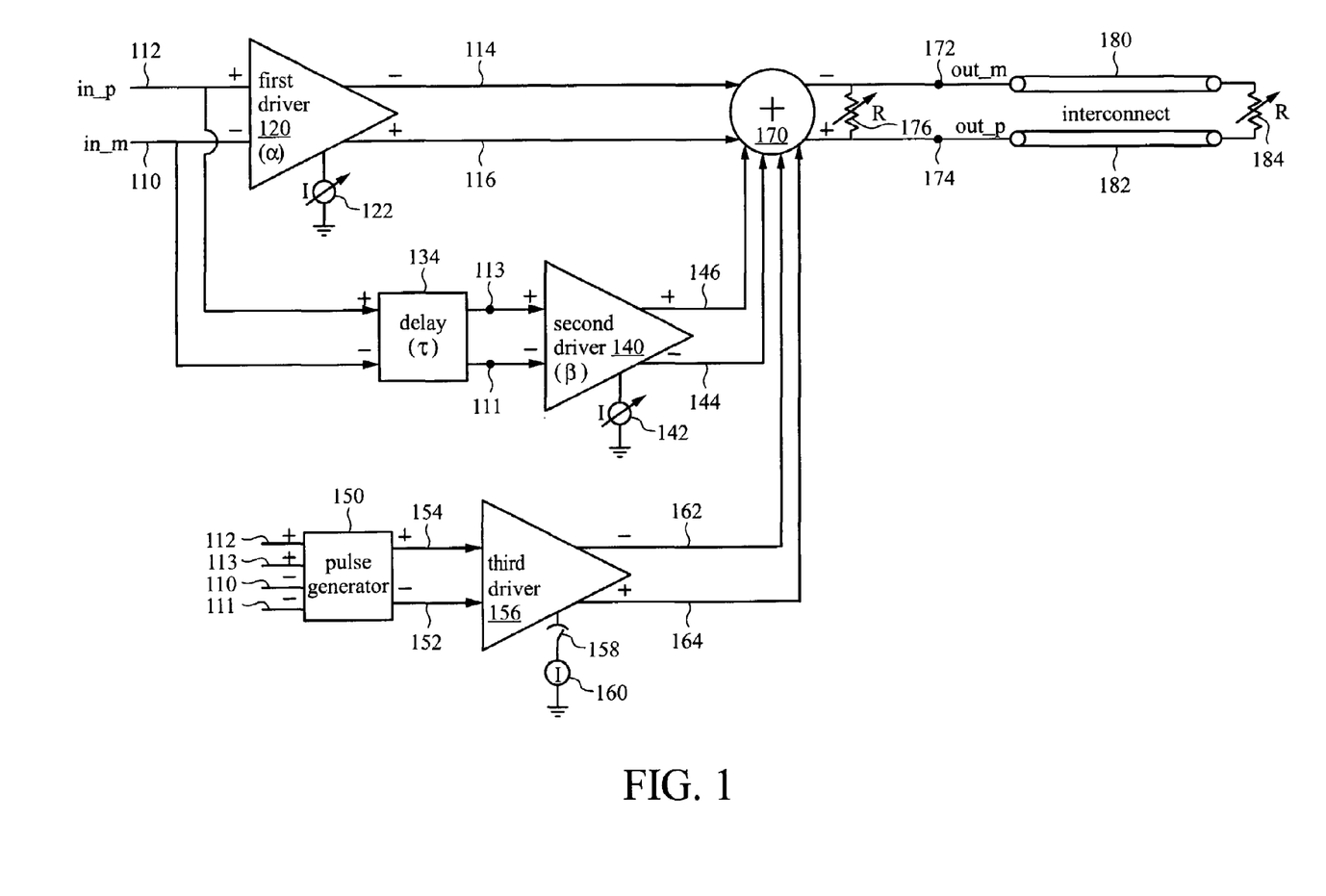
FIG. 1 is a block diagram of a programmable driver circuit of an embodiment of the present invention.

FIG. 1 is a block diagram of a programmable driver circuit of an embodiment of the present invention. The programmable driver circuit converts rail-to-rail differential voltage (e.g., Vdd and ground) inputs in_p (plus input) 112 and in_m (minus input) 110 to small signal differential voltage outputs out_p (plus output) 174 and out_m (minus output) 172. Output out_m 172 corresponds to input in_p 112 and output out_p 174 corresponds to input in_m 110. Inputs in_m 110 and in_p 112 are connected to first differential driver circuit 120 (gain $\alpha$), programmable delay 134 (delay $\tau$), and pulse generator 150 (pulse duration $\tau$).

The output signals 111 and 113 of programmable delay 134 are connected to a second-differential driver circuit 140 (gain $\alpha$) and to pulse generator 150. The signals 111 and 113 input into second driver 140 are the input signals in_p 112 and in_m 110 delayed by a time $\tau$. The outputs 144 and 146 of second driver are such that output 144, the minus output of second driver 140, is added in the summation circuit 170 to the plus output 116 of the first driver 120, and such that output 146, the plus output of second driver 140, is added in the summation circuit 170 to the minus output 114 of the first driver 120.

Pulse generator 150 produces a differential pulse of duration $\tau$ on its output lines 152 and 154. The output lines 152 and 154 are connected to a third differential driver circuit 156. The third driver 156 produces additional current during the pulse period $\tau$ to output lines 162 and 164. The outputs 162 and 164 of third driver 156 are such that output 162, the minus output of third driver 156, is added in the summation circuit 170 to the minus output 114 of the first driver 120, and such that output 164, the plus output of third driver 156, is added in the summation circuit 170 to the plus output 116 of the first driver 120.

A summation circuit (or summation node) 170 receives inputs 114/116 from the first differential driver circuit 120, outputs 146/144 from the second differential driver circuit 120, and outputs 162/164 from the third differential driver circuit 156. Summation circuit 170 is connected to programmable resistance R 176 which is connected across summation circuit 170 differential outputs out_m 172 and out_p 174. Programmable impedance or programmable resistance R 176 assists in controlling the differential output voltage swings across 172 and 174. Outputs out_m 172 and out_p 174 are connected to interconnect lines 180 and 182, respectively. There is a programmable termination impedance or programmable termination resistance R 184 (similar in structure to programmable resistance R 176) at the end of interconnect lines 180/182 for reducing reflections.

The two push-pull current drivers, i.e., first driver circuit 120 ($\alpha$ gain) and second driver circuit ($\beta$ gain) 140, supply the bulk of the line driver current to the interconnect lines 180/182. These two drivers have programmable current sources, e.g., I 122 and I 142 for first driver 120 and second driver 140, respectively, that allow for increasing or decreasing the static power. In one embodiment the programmable current source I 122 is the same (or similar by a proportionality factor) as programmable current source I 142. In another embodiment the programmable current source I 122 is different from the programmable current source I 142. The second driver 140 has a gain $\beta$ that is different from the gain $\alpha$ of the first driver 120. In one embodiment $|\beta|<|\alpha|$, i.e., the second driver 140 has a gain that is less than that of the first driver 120. The second driver 140 (as connected to summation circuit 170), functionally, amplifies by $\beta$ an inverted and delayed (by $\tau$) differential input signal in_m/in_p 110/112. The effect of the second driver 140 is to boost the output current from summation circuit 170 at the high frequencies to compensate for the high frequency loss on interconnect 180/182.

A third driver 156 is active only during switching to improve the slew rate of the differential output 172/174. The pulse generator 150 produces a pulse of time duration $\tau$, which turns on third driver 156 for a time period $\tau$. The rest of the time, third driver 156 is off and uses no static power. The third driver 156 gives a further, but smaller boost, to the output current of summation circuit 170 in addition to the boost given by second driver 140 at high frequencies. The third driver 156 is connected to a switch 158, which is in turn connected to a constant current source 160. The switch 158 allows for the third driver 156 to be programmably disabled if the third driver 156 is not needed.

In one embodiment of the present invention the programmable current sources I 122 and I 142, the switch 158, programmable delay element 134, programmable swing control resistance R 176, and programmable termination resistance R 184 are programmed by setting or clearing memory cells in the configuration memory of a PLD, for example an FPGA. In other embodiments the programming is done by setting one or more random access memory cells, one or more directly addressable memory cells, one or more non-volatile memory cells, one or more configuration memory cells, or any combination thereof.

Figure 2:
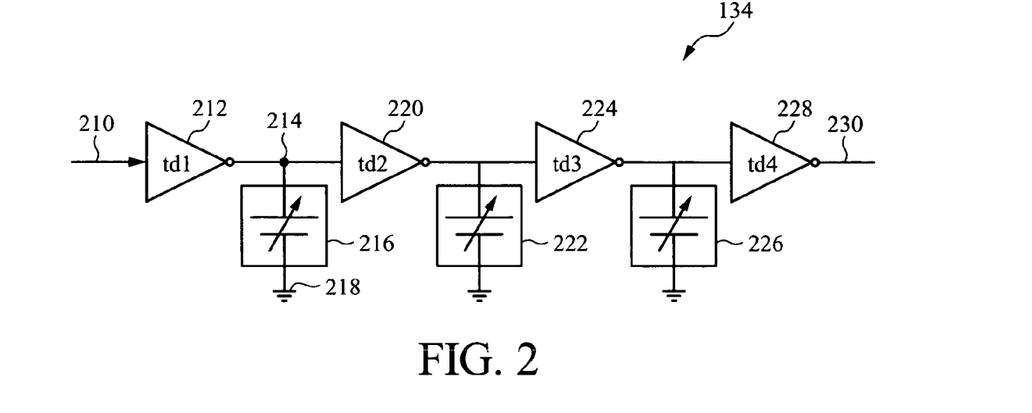
FIG. 2 is a schematic of a programmable delay circuit of an embodiment of the present invention.

FIG. 2 is a schematic of a programmable delay circuit 134 of an embodiment of the present invention. The programmable delay circuit 134 includes a plurality of series connected inverters, for example, td1 212, td2 220, td3 224, and td4 228. Inverter td1 212 is connected to a programmable capacitance 216 coupled to ground 218. Similarly, inverters td2 220 and td3 224 are connected to programmable capacitances 222 and 226, respectively. By varying the capacitances in programmable capacitances 216, 222, and 226, a signal input at 210, e.g., x(t), can be delayed for a time period "$\tau$" at output 230, e.g., x(t–$\tau$). While four inverters and three programmable capacitances are shown in FIG. 2, this is for illustration purposes only, and the programmable delay circuit 134 in another embodiment includes at least two inverter circuits and at least one programmable capacitance.

Figure 3:
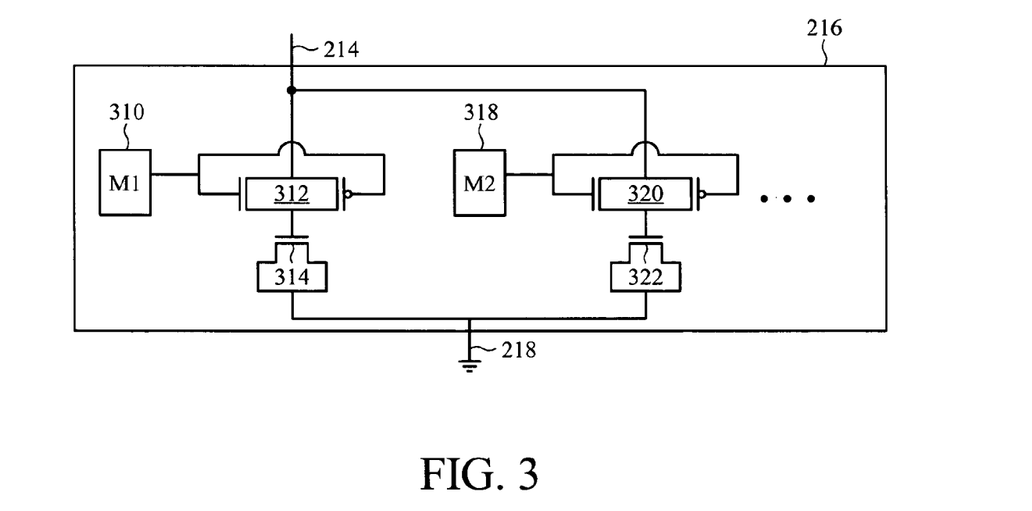
FIG. 3 is a schematic of a programmable capacitance 216 of an embodiment of the present invention.

FIG. 3 is a schematic of a programmable capacitance 216 of an embodiment of the present invention. The programmable capacitance 216 includes one or more parallel connected circuits, each having a transmission gate connected to a capacitance. For example, transmission gate 312 is connected to node 214 and capacitance 314, where capacitance 314 is connected to ground 218. Transmission gate 312 is controlled by memory cell M1 310. Transmission gate 320 is connected to node 214 and capacitance 322, where capacitance 322 is connected to ground 218. Transmission gate 320 is controlled by memory cell M2 318. In one embodiment M1 and M2 may be static random access memory (SRAM) cells as found in a PLD.

Figure 4:
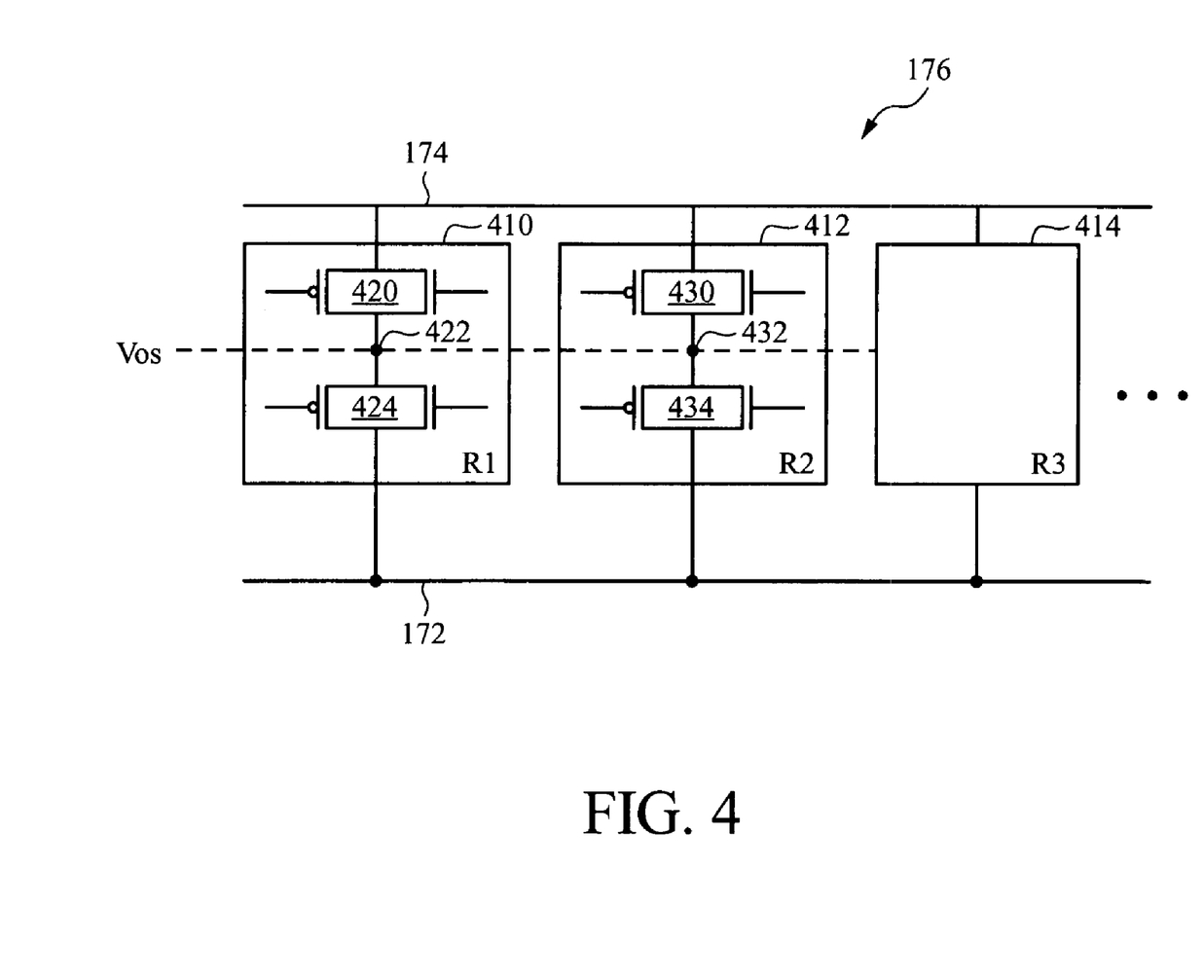
FIG. 4 is a schematic of a programmable resistance of an embodiment of the present invention.

FIG. 4 is a schematic of a programmable resistance 176 of an embodiment of the present invention. The programmable resistance 716 includes one or more resistance blocks, e.g., R1 410, R2 412, and R3 414, connected in parallel between lines 172 and 174. Each resistance block has two series connected transmission gates, e.g., 420 connected to 424 and 430 connected to 434, where each transmission gate is controlled by its own memory cell (not shown) structurally similar to transmission gate 312 in FIG. 3. For example there can be four SRAM cells for transmission gates 420, 424, 430, and 434. Typically, both transmission gates in each resistance block are turned on together. Hence, in R1 410, for example, when transmission gates 420 and 424 are on, the voltage at node 422 is at the static common mode operating voltage of the differential output signal. Turning on more resistive blocks, e.g., R2 412, reduces the resistance between lines 172 and 174 and hence has the effect of reducing the voltage swing of the differential output of the summation circuit 170 (see FIG. 1).

The programmable terminal resistance R 184 has a structure similar to that shown in FIG. 4. By programming the memory cells that control the transmission gates in the parallel connected resistive blocks of FIG. 4, the terminal resistance at the end of interconnect lines 180/182 can be set to minimize or reduce reflections and to equalize the signal between interconnect lines 180/182.

Figure 5A:
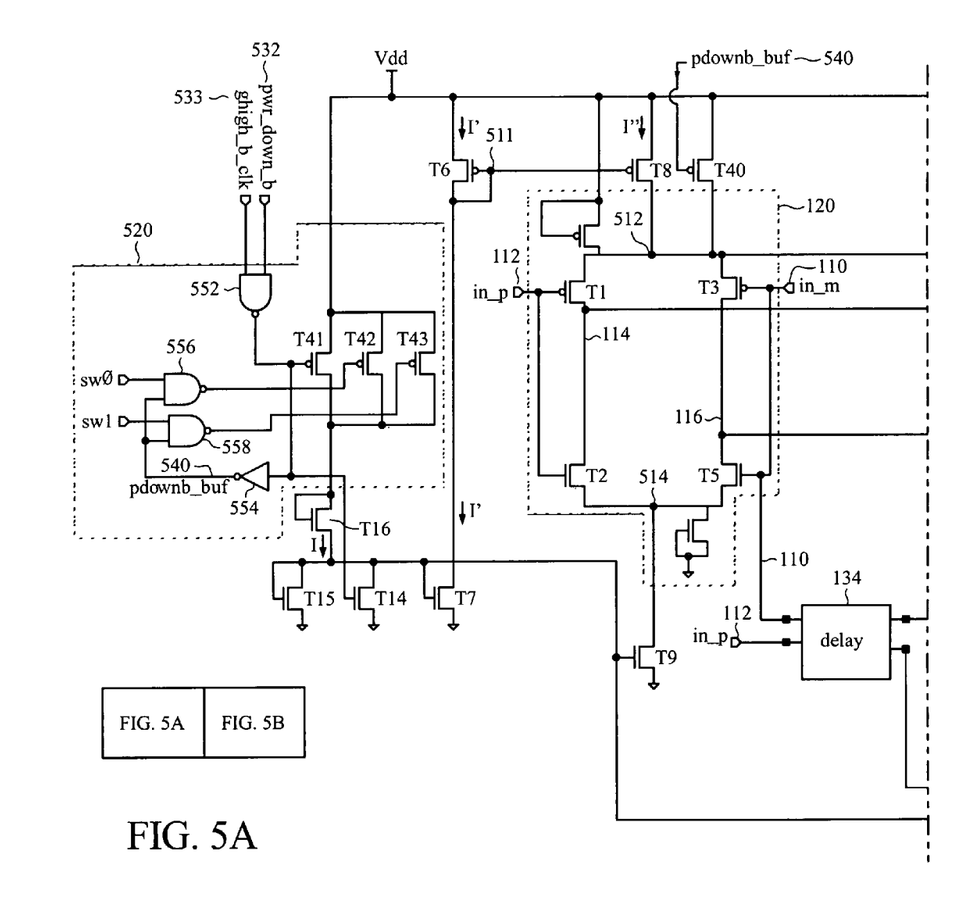
FIGS. 5A and 5B shows a schematic of a differential clock driver circuit of an embodiment of the present invention.
Figure 5B:
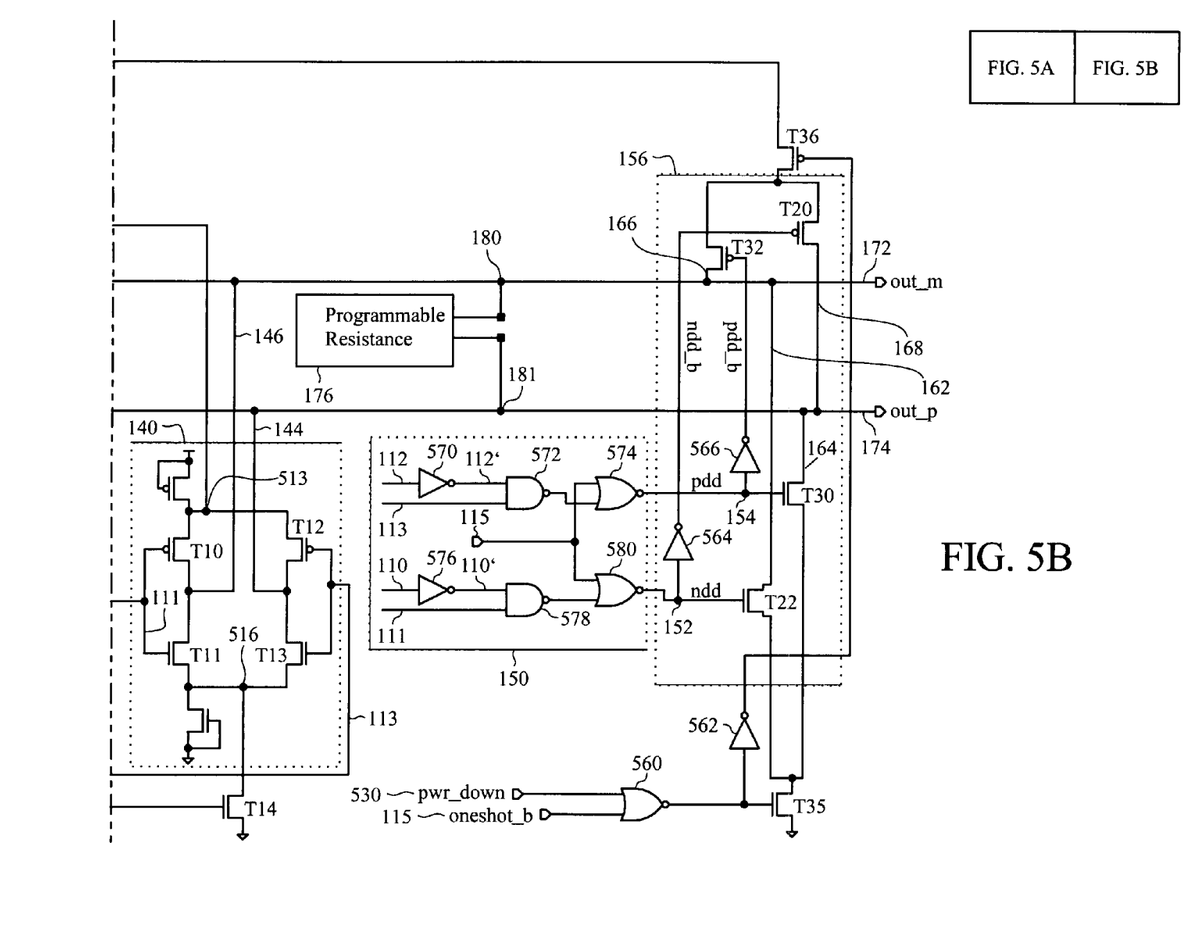

FIGS. 5A and 5B shows a schematic of a differential clock driver circuit of an embodiment of the present invention. In order to simplify explanation and for illustration purposes only, the reference numbers in FIG. 1 are repeated for like circuits. In other embodiments, alternative implementations of one or more of the circuits in FIG. 1 can be used. For example, the circuits in dotted block 120, dotted block 140, dotted block 150, and dotted block 156 of FIGS. 5A/B correspond to first driver 120, second driver 140, pulse generator 150, and third driver 156, respectively, of FIG. 1. Block 134 corresponds to the variable delay circuit 134 in FIG. 1 and programmable resistance block 176 corresponds to programmable resistance R 176 in FIG. 1.

Block 520 of FIG. 5A has a programmable resistance that is used to set a reference current for multiple current mirrors (labeled by current "I"). The current mirror reference leg has programmable resistance block 520 coupled to transistor T15. A second current mirror leg has transistor T6 coupled to transistor T7. The current I', in the second current mirror leg is proportional to the reference current I. A third current mirror leg has transistor T8 coupled through the first driver 120 and the second driver 140 to transistors T9 and T14, respectively. The current I" in the third current mirror leg is proportional to the current I' in the second current mirror leg (hence proportional to the reference current I by, not necessarily, the same proportionality factor). In this embodiment for the third current mirror leg, plus or positive common mode ("pcom") node 512 is shared between the first driver 120 and the second driver 140, while the first driver 120 has a first minus or negative common mode ("ncom") node 514 and the second driver 140 has a second "ncom" node 516. The third current mirror leg, in effect, has two branches: the first branch from pcom node 512 to ncom node 514 and the second branch from pcom node 512 to ncom node 516. The current (I2) in the second branch is proportional to the current in the first branch (I1). Hence, I2=λI1, I1+I2=I", and λ is a proportional constant. In one embodiment, in FIG. 1 current source 122 has current I1 and current source 142 has current I2.

In an alternative embodiment, the connection between node 512 and node 513 is broken and node 513 is connected to Vdd via an additional pMOS transistor (not shown). The additional pMOS transistor has its gate connected to node 511. In this alternative embodiment there are two pcoms, a first pcom at node 512 for the first driver circuit 120 and a second pcom at node 513 for second driver circuit 140. Hence, in this alternative embodiment, there is a fourth current mirror leg having the additional pMOS transistor coupled through the second driver 140 to transistor T14.

The programmable resistance block 520 and transistor T15 form the controlling part of the programmable current source as shown by I 122 and I 142 in FIG. 1. The other part of the programmable current sources I 122 and 142 are the second current mirror leg (T6 and T7) and third current mirror leg (T8 and T9/T14). The programmable resistance block 520 includes three pMOS transistors T41, T42, and T43 connected in parallel between Vdd and transistor T15 via transistor T16. When the programmable driver circuit is in operation, the signals pwr_down_b 532 and ghigh_b_clk 533 are a logical 1. Hence the output of NAND gate 552 is a logical 0. Transistor T41 is turned on and nMOS transistor T14 is turned off. Inverter 554 inverts the logical 0 and sets pdownb_buf 540 to a logical 1. pdownb_buf 540 is one input into NAND gates 556 and 558. Signals sw0 and sw1 are given by configuration memory cells (not shown) and input into NAND gates 556 and 558, respectively. NAND gate 556 is connected to the gate of transistor T42 and when sw0 is a logical 1, transistor T42 is turned on, hence increasing the current I. NAND gate 558 is connected to the gate of transistor T43 and when sw1 is a logical 1, transistor T43 is turned on, hence further increasing the current I.

First driver circuit 120 includes a pMOS transistor T1 connected in series with a nMOS transistor T2 and a pMOS transistor T3 connected in series with a nMOS transistor T5. Output signal 114 is connected between transistors T1 and T2. Output signal 116 is connected between transistors T3 and T5. Transistors T1 and T3 are connected to node 512. Transistors T2 and T5 are connected to node 514. The gates of transistors T1 and T2 receive in_p 112. The gates of transistors T3 and T5 receive in_n 110. While in_p 112 and in_m 110 are rail-to-rail differential input signals. Output signals 116 and 114 of the first driver circuit 120 are first small signal differential output signals. Output signals 114 and 116 correspond to input signals in_p 112 and in_m 110, respectively. Output signal 116 is connected to out_p 174 and output signal 114 is connected to out_m 172.

The delay circuit 134 receives in_m signal 110 and delays it by τ to produce signal 111. The delay circuit 134 also receives in_p signal 112 and delays it by τ to produce signal 113.

Second driver circuit 140 includes a pMOS transistor T10 connected in series with a nMOS transistor T11 and a pMOS transistor T12 connected in series with a mMOS transistor T13. Output signal 146 is connected between transistors T10 and T11. Output signal 144 is connected between transistors T12 and T13. Transistors T10 and T12 are connected to node 513. Transistors T11 and T13 are connected to node 516. The gates of transistors T10 and T11 receive signal 111 from delay circuit 134. The gates of transistors T12 and T13 receive signal 113 from delay circuit 134. While signals 111 and 113 are rail-to-rail differential input signals. Output signals 146 and 144 of the second driver circuit 140 are second small signal differential output signals. Output signals 146 and 144 correspond to input signals 111 (delayed version of in_m 110) and 113 (delayed version of in_p 112), respectively. Output signal 144 is connected to out_p 174 and output signal 146 is connected to out_m 172.

Pulse generator 150 includes two NOR gates 574 and 580, whose outputs pdd and ndd are connected to nMOS transistors T30 and T22 respectively. Setting oneshot_b 115 to a logical 1 outputs a logical 0 from NOR gates 574 and 580, sets pdd and ndd to zero and turns off T30 and T22. Also, since NOR gate 574 is connected to pMOS transistor T32 via inverter 566 and since NOR gate 580 is connected to pMOS transistor T20 via inverter 564, transistors T20 and T32 are also turned off.

In normal operation the oneshot_b 115 is a logical 0, hence NOR gates 574 and 580 act like inverters. NAND gates 572 and 578 connected to NOR gates 574 and 580, respectively, thus act like AND gates to produce pulses pdd of duration τ at node 154 and opposite pulses ndd of duration τ at node 152. NAND gate 572 receives input signal in_p 112 (after it has been inverted by inverter 570) and signal 113 (inp2d) from delay circuit 134. NAND gate 578 receives input signal in_m 110 (after it has been inverted by inverter 576) and signal 111 (inm2d) from delay circuit 134.

Third driver circuit 156 receives the pulses pdd and ndd from pulse generator circuit 150 and will boost the output current for out_p 174 and out_m 172 during the pulse periods. During the pulse period τ, when pdd is a logical 1, T30 is on and pdd_b is inverted by inverter 566 to produce a logical 0, hence turning on pMOS transistor T32. Transistor T30 removes charge from out_p 174 via line 164, hence making it more negative. Transistor T32 adds charge to out_m 172 via line 166, hence making it more positive. Similarly, during the pulse period τ, when ndd is a logical 1, NMOS transistor T22 is on and ndd_b is inverted by inverter 564 to produce a logical 0, hence turning on pMOS transistor T20. Transistor T22 removes charge from out_m 172 via line 162, hence making it more negative. Transistor T20 adds charge to out_p 174 via line 168, hence making it more positive.

nMOS transistor T35 is connected to nMOS transistors T22 and T30, and T35 has a gate connected to NOR gate 560. The gate of T35 is connected to inverter 562, which is further connected to the gate of pMOS transistor T36. T36 is further connected to PMOS transistors T20 and T32. When either the pwr_down signal 530 or oneshot_b signal 115 is a logical 1, the output of NOR gate 560 is a logical 0, turning off transistors T35 and T36. Hence third driver circuit 156 is turned off.

With reference to FIGS. 5A/B and with further reference to FIG. 1, the summation circuit, in one embodiment of the present invention, includes two common wired points: a plus wired node 181 for the line or signal 116 from the first driver 120, line or signal 144 from the second driver 140, and lines or signals 168 and 164 from the third driver 156; and a minus wired point 180 for the line or signal 114 from the first driver 120, line 146 or signal from the second driver 140, and lines or signals 166 and 162 from the third driver 156. The plus wired point node 181 sums the currents from lines 116, 144, 164 and 168 and outputs the result to out_p 174. The minus wired point node 180 sums the currents from lines 114, 146, 162 and 166 and outputs the result to out_m 172. Out_m 172 and out_p 174 are small signal differential signals that correspond to the rail-to-rail input signals in_p 112 and in_m 110, respectively.

The programmable resistance 176 is connected between nodes 180 and 181 and is used to control the voltage swings of the differential output pair out_p/out_m. An implementation of programmable resistance 176 of one embodiment of the present invention is shown in FIG. 4. In another embodiment programmable resistance 176 is implemented as a variable resistor.

Figure 6:
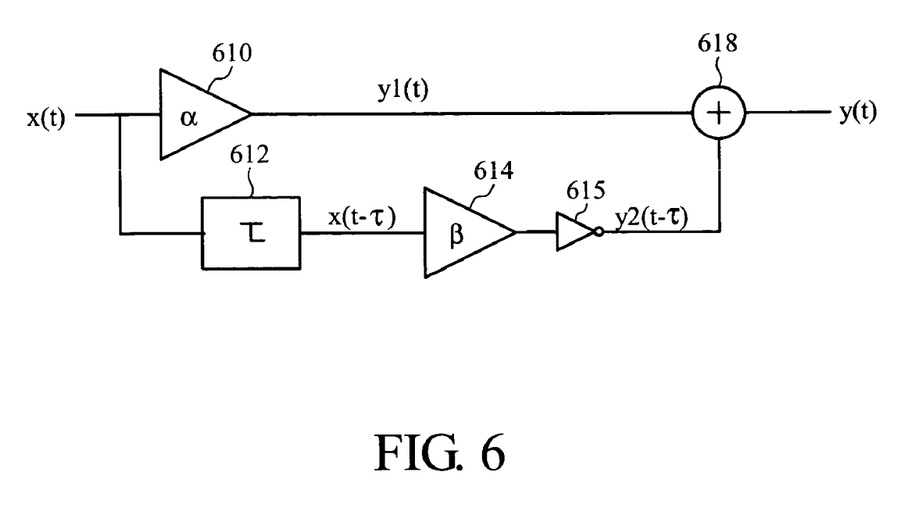
FIG. 6 is a functional block diagram of another embodiment of the present invention.

FIG. 6 is a functional block diagram of another embodiment of the present invention. FIG. 6, for illustration purposes, shows only one signal path of the differential signal. Input signal x(t) is amplified by first amplifier 610, hence:

$$y1(t)=\alpha x(t)$$

Input signal x(t) is also delayed by a time period $\tau$ in delay circuit 612 to give $x(t-\tau)$. $x(t-\tau)$ is then amplified by second amplifier 614 and inverted by inverter 615, hence:

$$y2(t-\tau)=\beta \overline{x}(t-\tau)$$

$y2(t-\tau)$ is added to $y1(t)$ by sum block 618 to give $y(t)$:

$$y(t)=y1(t)+y2(t-\tau)=\alpha x(t)+\beta \overline{x}(t-\tau)$$

Figure 7:
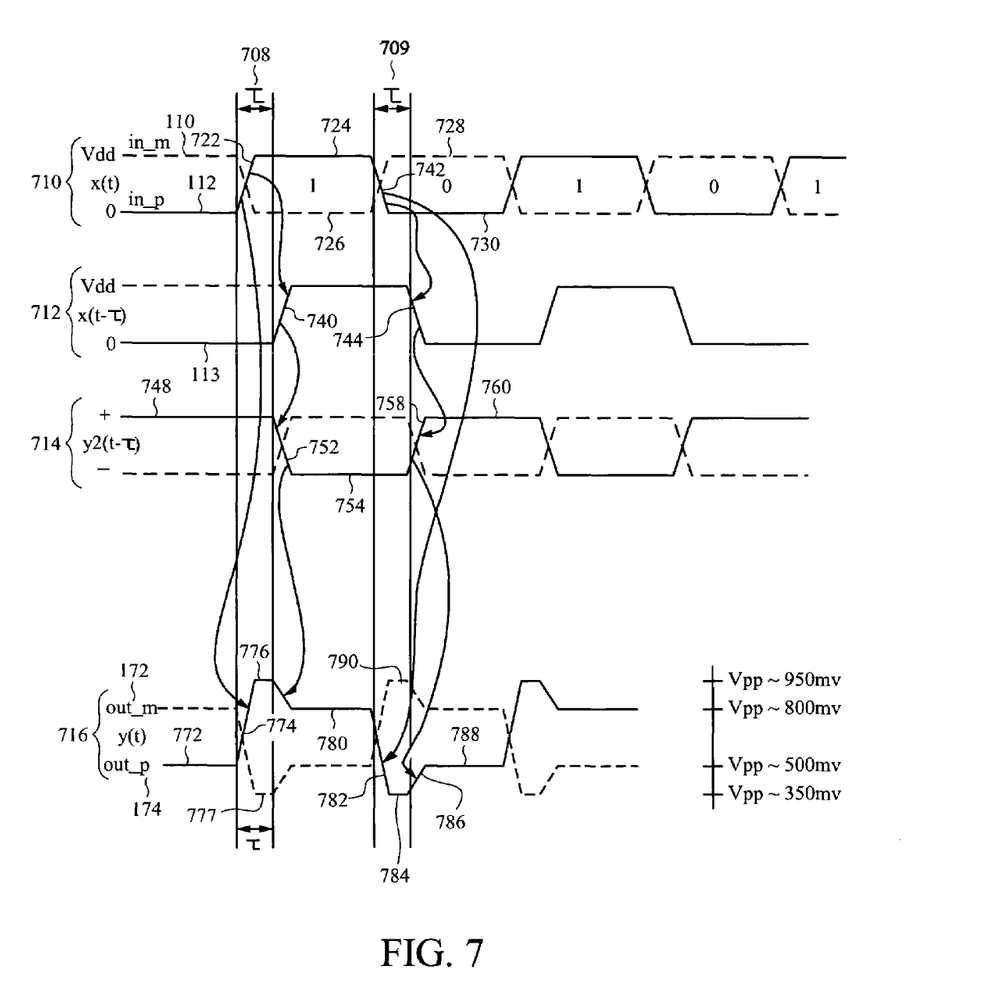
FIG. 7 is a timing diagram of some of the signals shown in FIG. 6.

FIG. 7 is a timing diagram of some of the signals shown in FIG. 6. Where appropriate, labels as given in FIG. 1 are also shown. First waveform 710 gives x(t) (solid line), that is a signal similar to in_p 112 (the minus signal in_m 110 is shown by the dotted line). A logical 1 may be represented by in_p=Vdd (724) and in_m=0 (726) and a logical 0 may be represented by in_p=0 (730) and in_m=Vdd (728). The second waveform 712 shows x(t) delayed by $\tau$, i.e., $x(t-\tau)$. The third waveform 714 shows the $\beta$ amplified by amplifier 614 and inverted by inverter 615, i.e., $y2(t-\tau)$. The fourth waveform 716 shows the output of the sum block 618, i.e., y(t), which corresponds to out_p 174.

In the waveform 716 of FIG. 7, out_p begins at a value 772 (e.g., ~500 mv) which corresponds to in_p at a value 0. During time period $\tau$ 708, when in_p transitions from 0 to Vdd and $y2(t-\tau)$ remains at a value 748, y(t) transitions (774) to a value 776 (e.g., ~950 mv) from the value 772. After time period $\tau$ 708, $y2(t-\tau)$ transitions (752) to a value 754, because $x(t-\tau)$ transitions (740) from 0 to vdd. Hence, y(t) changes from the value 776 (e.g., ~950 mv) to a value 780 (e.g., ~800 mv). During the next time period $\tau$ 709, in_p transitions from Vdd to 0, and $y2(t-\tau)$ remains at a minus value 754, and y(t) transitions from the value 780 (e.g., ~800 mv) to a value 784 (e.g., ~350 mv). After the second time period $\tau$ 709, $y2(t-\tau)$ transitions (758) to a plus value 760, because $x(t-\tau)$ transitions (744) from Vdd to 0. Hence y(t) changes from the value 784 (e.g., ~350 mv) to a value 788 (e.g., ~500 mv).

FIG. 7 waveforms 710 and 716, represents examples of the rail-to-rail differential inputs, in_m 110 and in_p 112, and the small signal differential inverted outputs, out_p 174 and out_m 172 of FIGS. 1 and 6. The second amplifier 614 (or second driver 140), boosts the y(t) voltage difference by, for example, 300 mv (from 300 mv to 600 mv) at the edges or transitions of y(t).

Figure 8:
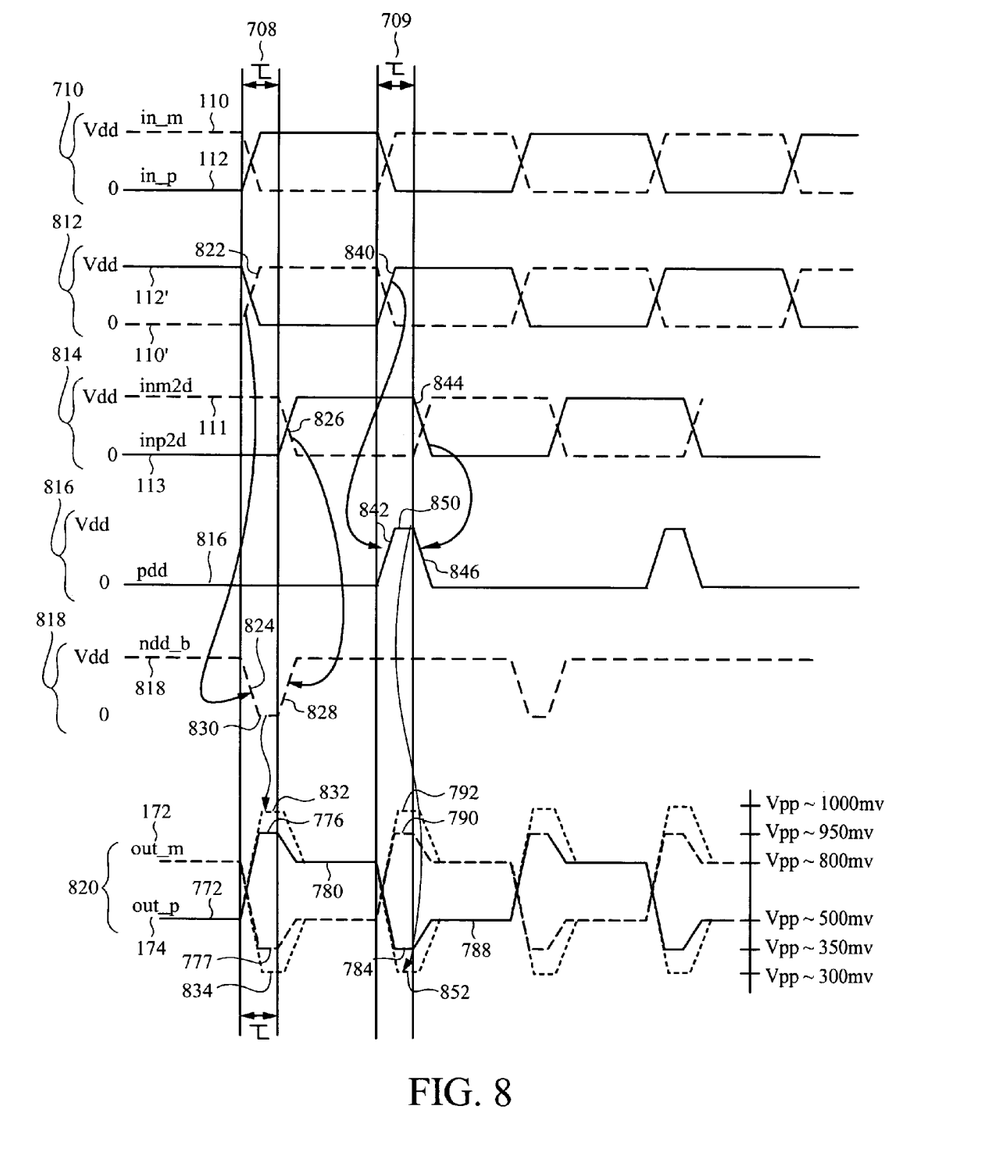
FIG. 8 is a timing diagram of some of the signals shown in FIGS. 5A and 5B.

FIG. 8 is a timing diagram of some of the signals shown in FIGS. 5A and 5B. With reference to FIG. 7, waveform 710 in FIG. 7 is the same as waveform 710 in FIG. 8 and waveform 820 in FIG. 8 has some signals similar to waveform 716 in FIG. 7. Waveform 812 is waveform 710 inverted and is the outputs of inverter 570 for signal 112' and inverter 576 for signal 110'. Waveform 814 is waveform 710 delayed by time delay t (the differential outputs inm2d 111 and inp2d 113 of delay circuit 134). Waveform 816 shows the pdd pulse(s) that are output from NOR gate 574 (FIG. 5B). When pdd is at Vdd, e.g., 850, nMOS transistor T30 is turned on and signal 164 pulls out_p 174 down, i.e., more negative. Similarly, when pdd is at vdd, pdd_b is at 0 volts (not shown) and PMOS transistor T32 is turned on and signal 166 pulls out_m 172 toward Vdd, i.e., more positive. Waveform 818 shows the ndd_b pulse(s) that are output from inverter 564 (FIG. 5B). When ndd_b is at 0 volts, e.g., 830, pMOS transistor T20 is turned on and signal 168 pulls out_p 174 toward Vdd, i.e., more positive. Also, when ndd_b is at 0 volts, ndd is at Vdd volts (not shown) and nMOS transistor T22 is turned on and signal 162 pulls out_m 172 down, i.e., more negative.

Waveform 820 shows the small signal differential output out_p 174 corresponding to the rail-to-rail input in_m 110 of waveform 710 and waveform 820 also shows the small signal differential output out_m 172 corresponding to the rail-to-rail input in_p 112 of waveform 710. With reference to the out_p waveform (solid line) in FIGS. 7 and 8, they are the same or similar, except during the delay intervals $\tau$ such as 708 and 709 where the voltage is either raised by 50 mv, e.g., 776 to 832 (950 mv to 1000 mv) or lowered by 50 mv, e.g., 784 to 852 (350 mv to 300 mv). Similarly, with reference to the out_m waveform (dotted line) in FIGS. 7 and 8, they are the same or similar, except during the delay intervals $\tau$ such as 708 and 709 where the voltage is either lowered by 50 mv, e.g., 777 to 834 (350 mv to 300 mv) or raised by 50 mv, e.g., 790 to 792 (950 mv to 1000 mv), e.g., during interval 709.

Thus in an exemplary embodiment a differential clock driver circuit for a differential clock tree has been described. The differential clock driver circuit receives a rail-to-rail differential input signal and outputs a small signal differential clock signal. The small signal differential clock signal has been amplified at the transitions in order to improve signal quality when the signal is received after propagating over an interconnection line. The differential clock driver circuit includes: a programmable reference current source controlling a current in a leg of a current mirror; a first driver circuit and a second driver circuit receiving potions of the current; a programmable delay circuit coupled to the second driver circuit; and a summation circuit coupled to the outputs of the first driver circuit and the second driver circuit. The differential clock driver circuit may further include: a programmable resistance coupled to the summation circuit, a third driver circuit coupled to the summation circuit; and a pulse generator circuit coupled to the third driver circuit, wherein the third driver circuit is responsive to a pulse produce by the pulse generator circuit.

A use of an embodiment of the differential clock driver circuit for a differential clock tree is given in concurrently filed, commonly assigned U.S. Patent Application titled, "A Programmable Logic Device Having an Embedded Differential Clock Tree", by Vic Vadi, et. al., which is herein incorporated by reference.

Although the invention has been described in connection with several embodiments, it is understood that this invention is not limited to the embodiments disclosed, but is capable of various modifications, which would be apparent to one of ordinary skill in the art. For example, while a differential driver circuit for use in a clock tree is described in one embodiment, the differential driver circuit may drive a small signal differential signal on any interconnection line and is not limited to only clock signals or use in a clock tree. Thus, the invention is limited only by the following claims.

What is claimed is:

1. A circuit comprising:
   a first driver circuit coupled to a programmable current source, and receiving a rail-to-rail differential input signal;
   a programmable delay circuit coupled to the first driver circuit and configured to delay the rail-to-rail differential input signal;
   a second driver circuit coupled to the programmable delay circuit; and
   a summation circuit coupled to the first driver circuit and the second driver circuit and outputting a small signal differential output signal;
   a pulse generator receiving the rail-to-rail differential input signal and a differential output signal of the programmable delay circuit; and
   a third driver circuit coupled to the pulse generator wherein the small signal differential output signal of the summation circuit is produced by adding together a differential output signal of the first driver circuit to a differential output signal of the second driver to a differential output signal of the third driver.

2. The circuit of claim 1 wherein the second driver circuit is further coupled to the programmable current source.

3. The circuit of claim 1 wherein the third driver circuit comprises a switch coupled to a fixed current source.

4. The circuit of claim 1 further comprising a programmable impedance coupled across a plus terminal and a minus terminal of the small signal differential output signal of the summation circuit.

5. The circuit of claim 4 further comprising differential interconnect lines coupled to the plus and minus terminals of the small signal differential output signal of the summation circuit at one end of the differential interconnect lines and to a programmable termination impedance at an opposite end of the differential interconnect lines.

6. The circuit of claim 5 wherein the programmable termination impedance comprises resistive elements and is configured to reduce reflection over the differential interconnect lines.

7. The circuit of claim 5 wherein the programmable impedance comprise resistive elements and is configured to set a differential voltage swing of the small signal differential output signal to a predetermined value.

8. The circuit of claim 4 wherein the programmable impedance comprises a plurality of transistors, the plurality of transistors controlled by one or more configuration memory cells of a programmable logic device.

9. The circuit of claim 1 wherein the programmable delay circuit comprises an inverter coupled to a programmable capacitance.

10. The circuit of claim 9 wherein the programmable capacitance is configured using a configuration memory cell of a programmable logic device.

11. A differential driver circuit comprising:
    a programmable reference current source controlling a current in a leg of a current mirror;
    a first driver circuit and a second driver circuit, each driver circuit receiving a part of the current;
    a programmable delay circuit coupled to the second driver circuit; and
    a summation circuit coupled to the outputs of the first driver circuit and the second driver circuit;
    a third driver circuit coupled to the summation circuit; and
    a pulse generator circuit coupled to the third driver circuit, wherein the third driver circuit is responsive to a pulse produce by the pulse generator circuit.

12. The differential driver circuit of claim 11 wherein the programmable reference current source comprises a plurality of parallel connected transistors.

13. The differential driver circuit of claim 11 wherein the first driver circuit comprises a first serially connected PMOS transistor/nMOS transistor pair coupled to a second serially connected PMOS transistor/nMOS transistor pair.

14. The differential driver circuit of claim 13 wherein the second driver circuit comprises a third serially connected PMOS transistor/nMOS transistor pair coupled to a fourth serially connected pMOS transistor/nMOS transistor pair.

15. The differential driver circuit of claim 11 wherein the programmable delay circuit comprises a plurality of programmable capacitance elements connected in parallel.

16. The differential driver circuit of claim 11 wherein the third driver circuit is coupled to a PMOS transistor and a nMOS transistor for providing current to the third driver circuit, wherein the pMOS transistor and the nMOS transistor, responsive to a logic value, are turned off.

17. The differential driver circuit of claim 11 wherein the pulse generator circuit comprises a plurality of logic gates.

18. The differential driver circuit of claim 11 further comprising a programmable resistance coupled to the summation circuit.

* * * * *